(12) United States Patent
Jiang (10) Patent No.: US 11,671,174 B1
(45) Date of Patent: Jun. 6, 2023

(54) SYSTEMS AND METHODS FOR IMPROVING A LAUNCH POWER IN AN OPTICAL LINK

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/675,491

(22) Filed: Feb. 18, 2022

(51) Int. Cl.
*H04B 10/079* (2013.01)
*H04B 10/61* (2013.01)

(52) U.S. Cl.
CPC ............... *H04B 10/07953* (2013.01); *H04B 10/6161* (2013.01)

(58) Field of Classification Search
None
See application file for complete search history.

(56) References Cited

U.S. PATENT DOCUMENTS

| | | | |
|---|---|---|---|
| 6,690,884 B1 * | 2/2004 | Kelty ................. | H04B 10/695 714/704 |
| 2003/0175037 A1 * | 9/2003 | Kimmitt .............. | H04B 10/516 398/198 |
| 2003/0185563 A1 * | 10/2003 | Stephens ............. | H04B 10/296 359/25 |
| 2009/0214215 A1 * | 8/2009 | Li ...................... | H04B 10/2507 398/43 |
| 2011/0013907 A1 * | 1/2011 | Sugihara ............. | H04B 10/564 398/38 |

\* cited by examiner

*Primary Examiner* — Darren E Wolf
(74) *Attorney, Agent, or Firm* — BCF LLP (57) ABSTRACT

The disclosed systems and methods for improving a launch power in an optical link. The improvement of launch power in the optical link is based on: i) selecting an optical span from one or more optical spans within the optical link; ii) applying a power dither to a plurality of the optical signals propagating in the selected optical span; iii) selecting an optical signal from the plurality of the optical signals to which the power dither is applied; iv) correlating the power dither with a performance parameter of the selected optical signal; and v) based on the correlation, adjusting the launch power of a first optical amplifier in the selected optical span to minimize the correlation to approximately equal to zero.

16 Claims, 6 Drawing Sheets

SYSTEMS AND METHODS FOR IMPROVING A LAUNCH POWER IN AN OPTICAL LINK

CROSS-REFERENCE TO RELATED APPLICATIONS

This is the first application filed for the instantly disclosed technology.

TECHNICAL FIELD

The present disclosure generally relates to optical communications and, in particular, to systems and methods for improving a launch power in an optical link.

BACKGROUND

In the field of coherent optical communication systems, the fiber nonlinear interference (NLI) is one of the most common impairments. Modern coherent transceivers usually have powerful digital signal processing (DSP) capabilities, so that all the linear impairments, such as chromatic dispersion, can be fully compensated by a receiver DSP. Therefore, dispersion-uncompensated optical links are used for a few reasons: a) cost savings, no dispersion compensation fiber/module is required; b) higher OSNR, no additional loss from the dispersion compensation fiber/module; c) lower fiber nonlinearity, the NLI generated in different optical link location is less coherent compared to that in dispersion-compensated optical link.

Interestingly, in dispersion-uncompensated optical links, NLI can be treated (approximated) as additive noise. Therefore, in any transmission fiber span, there are two noise sources: the fiber nonlinear noise and the amplified spontaneous emission (ASE) noise generated by the optical amplifiers in the optical links. For a given fiber span, these two noises depend on the channel launch power into the fiber. As the launch power increases, the fiber nonlinear noise increases and the ASE noise from the downstream amplifier decreases. There exists a near optimal launch power that minimizes the sum of these two noises.

There are various conventional techniques in existence, which are based on simulations, which try to minimize the aggregated noises. However, there is a scope of improvement in further reducing the aggregating noises more efficiently.

To this end, there is an interest in developing a simple and efficient system and method for improving launch power in the optical links.

SUMMARY

The embodiments of the present disclosure have been developed based on developers' appreciation of the limitations associated with the prior art, namely the techniques based on experiments in a lab by using a reference link or by simulations, trying to minimize the aggregated noises. The issue with such conventional techniques is that the optimal power obtained by the experiments/simulations may not be very efficient in the real links.

Developers of the present technology have devised methods and systems for improving a launch power in an optical link. Various techniques of the present disclosure are directed towards improving the launch power that tends to minimize the sum of nonlinear noise and the ASE noise in real-time over the optical links.

In accordance with a first broad aspect of the present disclosure, there is provided a method for improving a launch power in an optical link comprising: selecting an optical span from one or more optical spans within the optical link; applying a power dither to a plurality of the optical signals propagating in the selected optical span; selecting an optical signal from the plurality of the optical signals to which the power dither is applied; correlating the power dither with a performance parameter of the selected optical signal; and based on the correlation, adjusting the launch power of a first optical amplifier in the selected optical span to minimize the correlation to approximately equal to zero In accordance with any embodiments of the present disclosure, the method further comprising: determining a sign of the correlation; and based on the sign of the correlation, adjusting the launch power of the first optical amplifier.

In accordance with any embodiments of the present disclosure, the optical span is selected in a predefined manner.

In accordance with any embodiments of the present disclosure, the optical span is selected in a random manner.

In accordance with any embodiments of the present disclosure, the optical signal is selected based on one of: the optical signal in the plurality of the optical signals having a power approximately equal to an average power of the plurality of optical signals; the optical signal in the plurality of the optical signals having a minimum noise margin; and the optical signal being any optical signal in the plurality of optical signals.

In accordance with any embodiments of the present disclosure, the power dither is applied by modulating a pump current of the first optical amplifier in the selected optical span.

In accordance with any embodiments of the present disclosure, the power dither has a frequency in a range of 1 to 1000 Hz.

In accordance with any embodiments of the present disclosure, the performance parameter is one of: a bit error rate (BER) of the selected optical signal received by a receiver; a signal-to-noise ratio (SNR) of the selected optical signal received by the receiver; and an error vector magnitude (EVM) of the selected optical signal received by the receiver In accordance with any embodiments of the present disclosure, the method further comprises removing the power dither from the plurality of the optical signals.

In accordance with any embodiments of the present disclosure, the removing of the power dither comprises: detecting the power dither at an output of a second optical amplifier in the selected optical span; and applying an opposite power dither to the second optical amplifier, the opposite power dither having a phase shift of 180 degrees from the power dither, the opposite power dither canceling out the power dither.

In accordance with a second broad aspect of the present disclosure, there is provided a system for improving a launch power in an optical link comprising: a non-transitory memory element having instructions thereon; a processor coupled to the non-transitory memory element to execute the instructions to cause the processor to: select an optical span from one or more optical spans within the optical link; apply a power dither to a plurality of the optical signals propagating in the selected optical span; select an optical signal from the plurality of the optical signals to which the power dither is applied; correlate the power dither with a performance parameter of the selected optical signal; and based on the correlation, adjust the launch power of a first optical amplifier in the selected optical span to minimize the correlation to approximately equal to zero.

In accordance with any embodiments of the present disclosure, the processor is further configured to: determine a sign of the correlation; and based on the sign of the correlation, adjust the launch power of the first optical amplifier.

In accordance with any embodiments of the present disclosure, the processor is further configured to remove the power dither from the plurality of the optical signals.

BRIEF DESCRIPTION OF THE FIGURES

Further features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for improving a launch power in an optical link.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must (by itself) exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for improving a launch power in an optical link.

Modern optical communication systems usually rely on C band (approximately 1528-1565 nm) for communications. However, recently L band (approximately 1567-1625 nm) has also been commercialized. The exact wavelength range may depend on service providers. Traditionally, the transmission band may be divided into 50 GHz or 100 GHz channels. Nowadays, as the baud rate exceeds 50 Gbps, and with the emergence of a super channel, channel spacing has become less rigid. As a result, there may be a few tens to more than 100 channels in the transmission band. To this end, any channel may experience Kerr nonlinearity from itself (SPM), and all other channels (XPM) co-propagating in the same fiber.

In addition to the nonlinear noise, the optical amplifiers in the optical links may contribute to amplified spontaneous emission (ASE) noise in the optical links. For a given fiber span, these two noises depend on the channel launch power into the fiber. As the launch power increases, the fiber nonlinear noise increases and the ASE noise from the downstream amplifier decreases.

There exists a near optimal per channel launch power that minimizes the total noise (sum of fiber nonlinear noise and ASE noise). This near optimal power depends on many factors, such as fiber type, length, loss, and amplifier noise figure, signal format, etc.

There are various conventional techniques in existence, which are based on experiments in a lab by using a reference link or by simulations, trying to minimize the aggregated noises. The issue with such conventional techniques is that the optimal power obtained by the experiments/simulations may not be very efficient in the real links.

With this said, there is a scope of improvement in further reducing the aggregating noises more efficiently. Various techniques of the present disclosure are directed towards improving the launch power that tends to minimize the sum of nonlinear noise and the ASE noise in real-time over the optical links.

Figure 1:
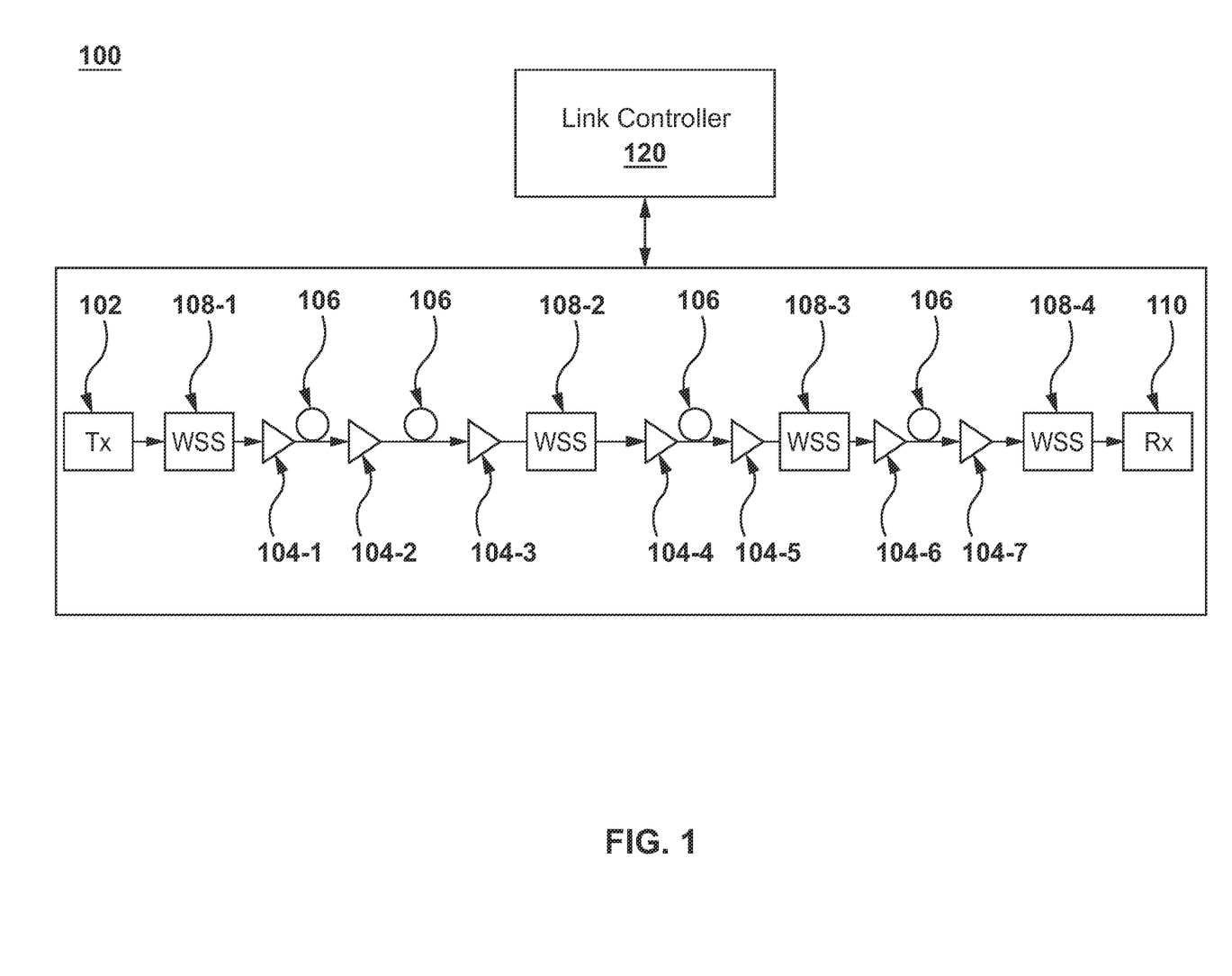
FIG. 1 illustrates a dense wavelength division multiplexing (DWDM) optical link, in accordance with various non-limiting embodiments of the present disclosure.

FIG. 1 illustrates a dense wavelength-division multiplexing (DWDM) optical link 100, in accordance with various non-limiting embodiments of the present disclosure. As shown, the DWDM link 100 may include a transmitter 102, optical amplifiers 104-1, 104-2, . . . 104-7, optical fibers 106, wavelength selective switches (WSSs) 108-1, 108-2, . . . 108-4, a receiver 110, and a link controller 120. The DWDM optical link 100 may include other components. However, such components have not been illustrated for the purpose of simplicity.

The transmitter 102 may generate optical signals (interchangeably referred to as wavelength channels) to be transmitted over the optical fibers 106. The optical amplifiers 104-1, 104-2, . . . 104-7 may be located along the optical fibers 106. The optical amplifiers 104-1, 104-2, . . . 104-7 may be used to compensate the loss from the optical fibers 16 and the associated components. It is to be noted that, for the purpose of simplicity only one transmitter 102 and one receiver 110 have been illustrated. In various non-limiting embodiments, there may be a set of transmitters (each with a unique wavelength) and a set of receivers. Optical signals from the set of transmitters may be multiplexed by an optical multiplexer on the transmitter side and the multiplexed optical signals may be demultiplexed by a demultiplexer on the receiver side.

The WSSs 108-1, 108-2, . . . 108-4 in between the transmitter 102 and the receiver 110 may be used to drop and/or add wavelength channels, and route wavelength channels. In certain non-limiting embodiments, the WSSs 108-1, 108-2, . . . 108-4 may act as optical filters. In certain non-limiting embodiments, the WSSs 108-1, 108-2, . . . 108-4 may adjust/equalize the wavelength channel power.

In certain non-limiting embodiments the DWDM optical link 100 may be a point-to-point optical link. In other non-limiting embodiments, the DWDM optical link 100 may be a portion of a mesh optical network with more advanced reconfigurable optical add-drop multiplexers (ROADMs) where the optical signals may re-routed to different fibers at ROADM site. How the DWDM optical link 100 is implemented should not limit the scope of the present disclosure.

In certain non-limiting embodiments, the link controller 120 may communicate with other components of the DWDM link 100 such as the transmitter 102, the optical amplifiers 104-1, 104-2, . . . 104-7, the WSSs 108-1, 108-2, . . . 108-4, the receiver 110 or the like. The link controller 120 may control functionalities of various components of the DWDM link 100 and may have access to a link topology of the DWDM link 100. Also, the link controller 120 may have access to the various link parameters e.g., WSS location, span loss, amplifier gain, amplifier noise figure, input power to amplifier or the like). It is to be noted that where the link controller 120 is located in the DWDM link 100 and how the link controller 120 communicate with the other components should not limit the scope of the present disclosure.

An optical signal travelling in the DWDM link 100 may experience an end-to-end noise including contributions from the transmitter 102, the WSSs 108-1, 108-2, . . . 108-4, the optical amplifiers 104-1, 104-2, . . . 104-7, the optical fibers 106, and the receiver 110. Various non-limiting embodiments of the present disclosure are directed towards minimizing ASE noise and nonlinear noise due to the optical amplifiers 104-1, 104-2, . . . 104-7, the optical fibers 106 respectively.

Figure 2:
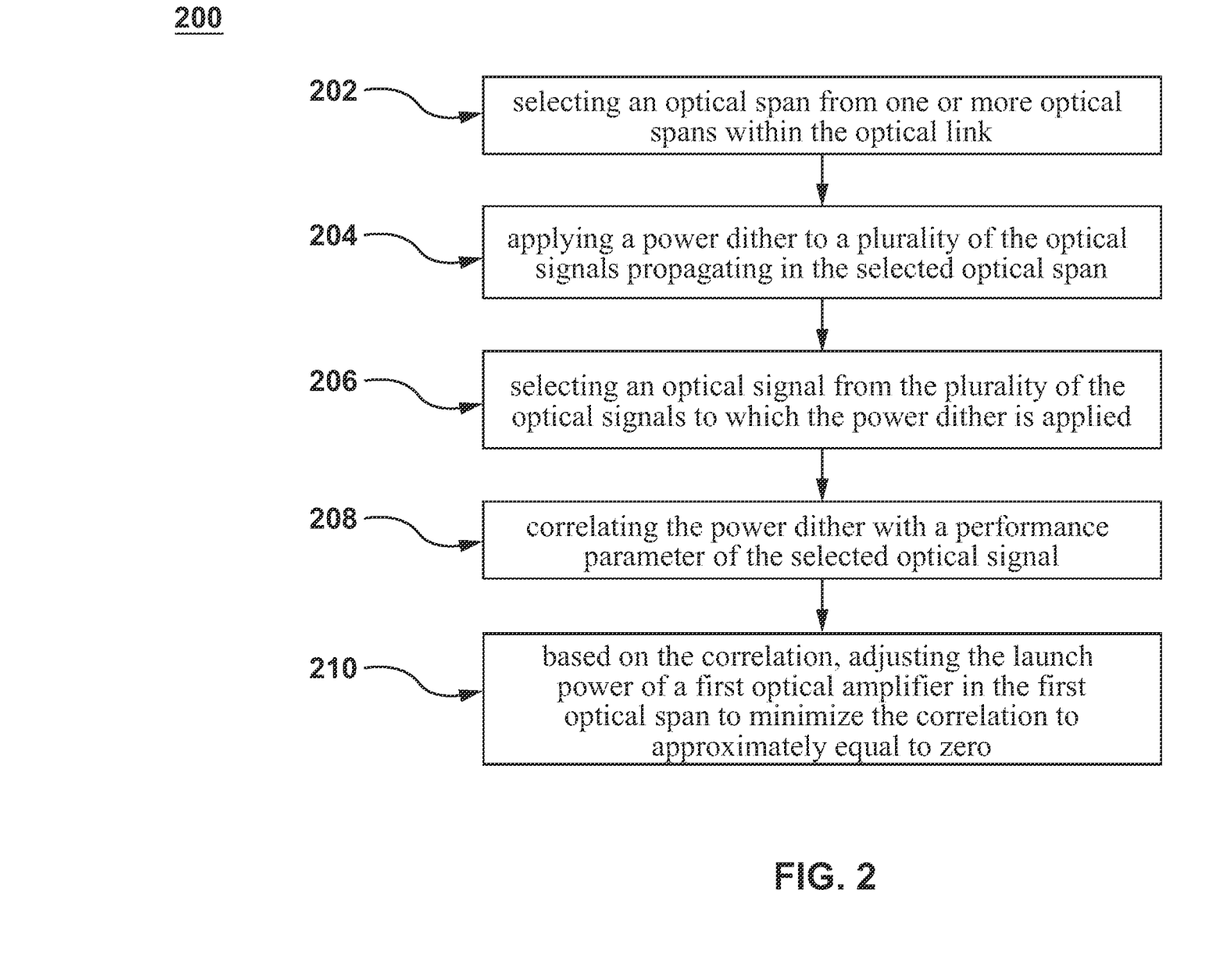
FIG. 2 depicts a flowchart of a process representing a method for improving a launch power in an optical link, in accordance with various non-limiting embodiments of the present disclosure.

FIG. 2 depicts a flowchart of a process 200 representing a method for improving a launch power in an optical link, in accordance with various non-limiting embodiments of the present disclosure. As shown, the process commences at step 202 where the link controller 120 selects an optical span from one or more optical spans in the optical link.

Figure 3:
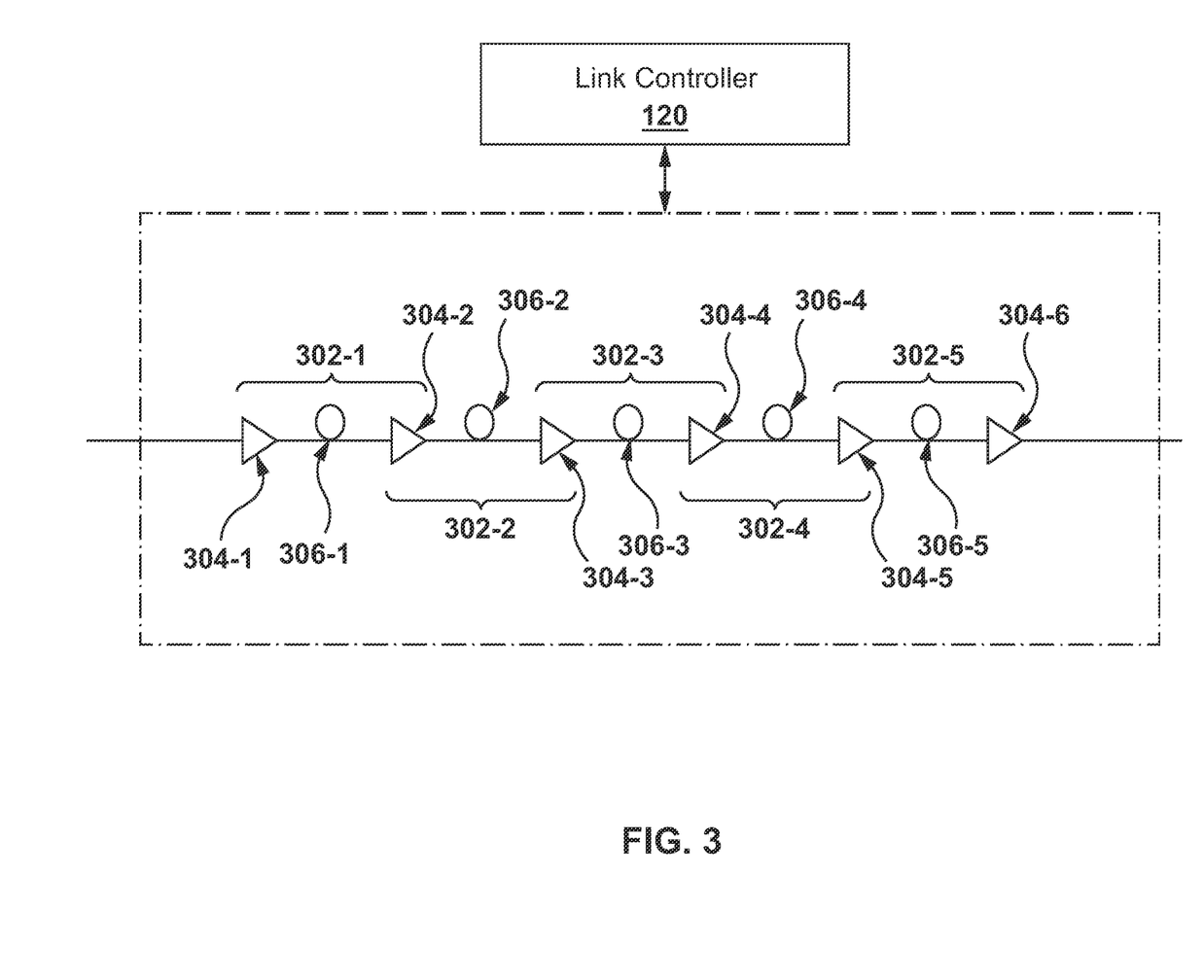
FIG. 3 illustrates a plurality of optical spans, in accordance with various non-limiting embodiments of the present disclosure

FIG. 3 illustrates a plurality of optical spans 302-1, 302-2, 302-3, 302-4, and 302-5, in accordance with various non-limiting embodiments of the present disclosure. Each of the optical spans 302-1, 302-2, 302-3, 302-4, and 302-5 may include a couple of optical amplifiers and a portion of the optical fibers 106 (as shown in FIG. 1). It is to be noted that the two consecutive optical spans may have a common optical amplifier. By way of example, the optical span 302-1 may include optical amplifiers 304-1, 304-2 and optical fibers 306-1, the optical span 302-2 may include optical amplifiers 304-2, 304-3 and optical fibers 306-2 and so on. The optical amplifiers 304-1, 304-2, . . . 304-6, may be implemented in a similar manner as the optical amplifiers 104-1, 104-2, . . . 104-7. It is to be noted that the plurality of optical spans 302-1, 302-2, 302-3, 302-4, and 302-5 implemented in the DWDM link 100 may be communicatively coupled to the link controller 120.

As previously noted, the link controller 120 may have access to a link topology of the DWDM link 100. The link controller 120 may select an optical span (e.g., 302-1) for improving a performance of the optical span (e.g., 302-2) in terms of nonlinear noise and ASE noise.

In certain non-limiting embodiments, the link controller 120 may select the optical span (e.g., 302-1) based on predetermined criteria. By way of example, the link controller 120 may select the optical spans (e.g., optical spans 302-1, 302-2, 302-3, 302-4, and 302-5) for performance improvement in a sequential manner. In other words, the link controller 120 may first select the first optical span 302-1 in the DWDM link 100. Once the performance of the first optical span 302-1 is improved, the link controller 120 may select the next the optical span 302-2 for performance improvement and so on. It is to be noted that the above selection criteria are some examples and any other suitable predetermined criteria may be used by the link controller 120 to select an optical span. In another non-limiting embodiment, the link controller 120 may select the optical spans (e.g., optical spans 302-1, 302-2, 302-3, 302-4, and 302-5) for performance improvement in a random or pseudorandom manner. It is to be noted that the manner in which the optical spans (e.g., optical spans 302-1, 302-2, 302-3, 302-4, and 302-5) are selected should not limit the scope of the present disclosure.

It will be appreciated that, for any of the optical spans 302-1, 302-2, 302-3, 302-4, and 302-5, a total noise may be a sum of the fiber nonlinear noise and the ASE noise. Assuming $P_1$ may be the input power into the optical span (e.g., the optical span 302-1), $P_2$ may be the input power into the first optical amplifier (e.g., optical amplifier 304-1 in the optical span 302-1), the total signal power normalized noise $n_{tot}$ in the optical span (e.g., the optical span 302-1) may be given by:

$$n_{tot} = n_{NLI} + n_{ASE} = k_1 P_1^2 + k_2 \frac{NF}{P_2} = k_1 P_1^2 + k_2 \frac{L \times NF}{P_1} \quad (1)$$

where $k_1$ is a fiber nonlinear factor, and may depend on many factors, such as the signal format, fiber type, fiber length, fiber loss, signal format, channel loading. It is to be noted that the nonlinear noise may be proportional to the input power squared. $k_2$ may be a constant related to the ASE noise, L may be the fiber loss, and NF may be the noise figure associated with the first optical amplifier (e.g., optical amplifier 304-1 in the optical span 302-1). It is to be noted that the noise terms $n_{tot}$, $n_{NLI}$, $n_{ASE}$ may be the signal power normalized, in other words, the noise terms $n_{tot}$, $n_{NLI}$, $n_{ASE}$ may be a represent noise-to-signal ratio.

Returning to FIG. 2, the process 200 advances to step 204 where the link controller 120 may apply a power dither to a plurality of optical signals propagating in the selected optical span (e.g., optical span 302-1). It is to be noted that the plurality of optical signals may be propagating in the selected optical span (e.g., optical span 302-1). In certain non-limiting embodiments, to apply the power dither to the plurality of optical signals, the link controller 120 may provide a control signal to the first optical amplifier (e.g., the optical amplifier 304-1) in the selected optical span (e.g., the optical span 302-1).

Based on the control signal, the first optical amplifier (e.g., the optical amplifier 304-1) may modulate a pump current to apply the power dither. In certain non-limiting embodiments, the power dither may be a low frequency signal having a frequency range between 1 and 1000 Hz.

The application of the power dither may alter the nonlinear noise and the ASE in the selected optical span (e.g., the optical span 302-1).

The process 200 advances to step 206 where the link controller 120 selects an optical signal from the plurality of optical signals to which the power dither is applied. The link controller 120 may select one of the plurality of optical signals based on any suitable criteria. Such criteria may include but are not limited to the optical signal in the plurality of optical signals having a power approximately equal to an average power of the plurality of optical signals, the optical signal in the plurality of optical signals having a minimum noise margin, and the optical signal being any optical signal in the plurality of optical signals.

In certain non-limiting embodiments, the receiver 110 may receive the plurality optical signals propagating in the DWDM 100. The receiver 110 may extract the optical signal from the plurality of the optical signals to which the power dither was added. The receiver 110 may compute a performance parameter of the selected optical signal.

In certain non-limiting embodiments, the performance parameter may be any suitable performance parameter. Some of the non-limiting embodiments of the performance parameters may include bit error rate (BER), signal-to-noise ratio (SNR), and error vector magnitude (EVM). It is to be noted that what performance parameter is computed and how that performance parameter is computed should not limit the scope of the present disclosure.

The process 200 advances to step 208 where the link controller 120 correlates the power dither with the performance parameter of the selected optical signal.

In certain non-limiting embodiments, the receiver 110 may forward the computed performance parameter to the link controller 120. The link controller 110 may be aware of the power dither. The link controller 110 may correlate the power dither with the performance parameter.

$$Cr=\int_o^T m(t)h(t)dt \qquad (2)$$

Where, m(t) may be the power modulation function and h(t) may be performance metrics, such as BER, SNR, EVM.

The process 200 advances to step 210 where, based on the correlation, the link controller 120 adjusts the launch power of a first optical amplifier in the selected optical span to minimize the correlation between the power dither and the performance parameter. In certain non-limiting embodiments, the link controller 120 may adjust (e.g., modify, alter, change, etc.) the launch power of the first optical amplifier (e.g., the optical amplifier 304-1). In order to adjust the launch power, the link controller 120 may alter the pump current of the first optical amplifier (e.g., the optical amplifier 304-1) in the selected optical span (e.g., the optical span 302-1).

Figure 4:
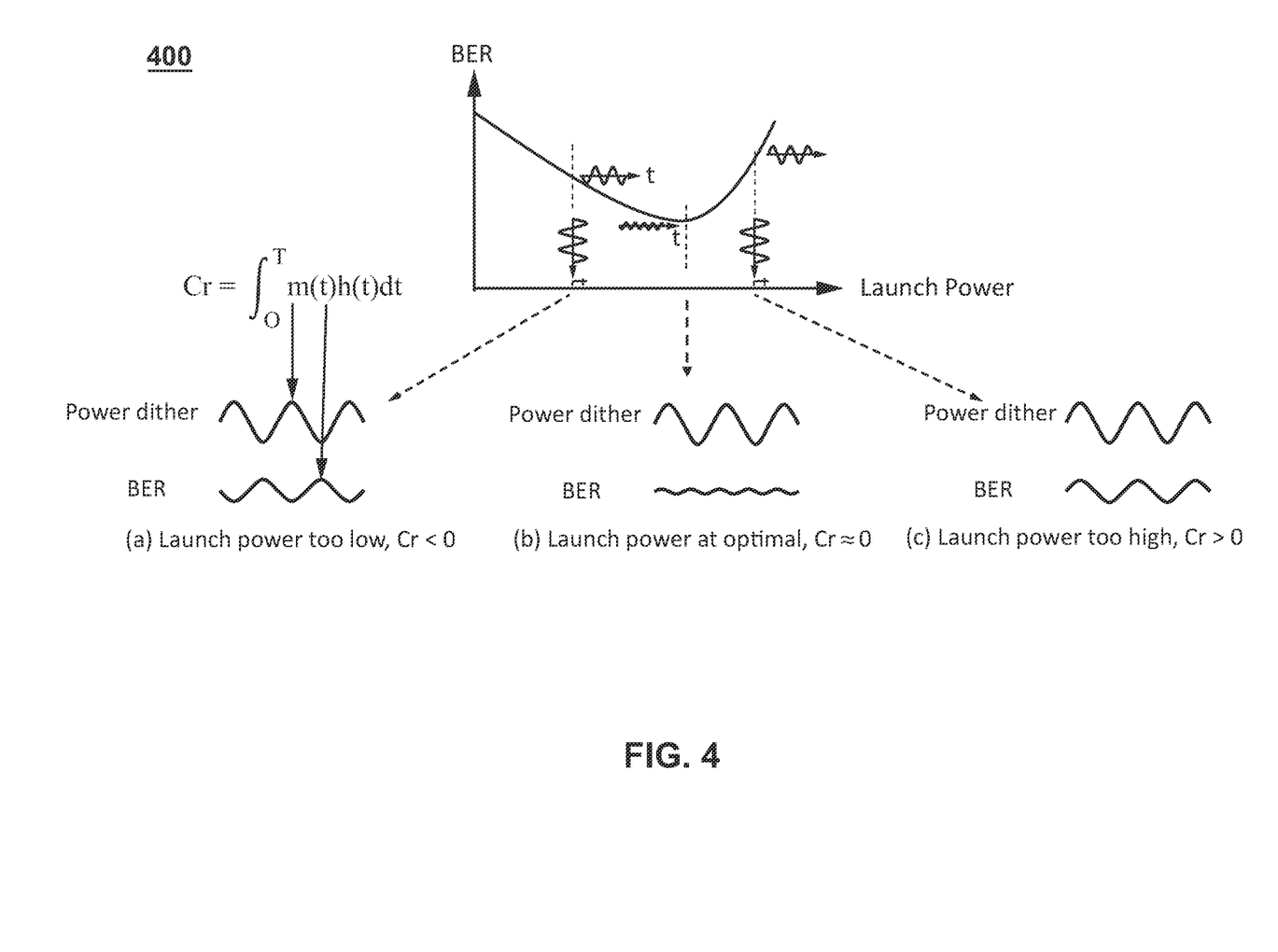
FIG. 4 illustrates a representative BER versus launch power, in accordance with various non-limiting embodiments of the present disclosure.

FIG. 4 illustrates a representative BER versus launch power 400, in accordance with various non-limiting embodiments of the present disclosure. As shown, there may be three representative cases. In first case, the launch power may be too low such that the correlation may be less than zero, in other words, the correlation may be negative. In second case, the launch power may be near to optimal such that the correlation may be approximately equal to zero. In third case, the launch power may be too high such that the correlation may be greater than zero, in other words, the correlation may be positive.

In certain non-limiting embodiments, the link controller 120 may determine a sign of the correlation. Based on the sign of the correlation, the link controller 120 may adjust the launch power of the first optical amplifier (e.g., the optical amplifier 304-1) and again compute the correlation between the launch power and the performance parameter such as BER, SNR or the like.

In certain non-limiting embodiments, the adjustment of launch power of the first optical amplifier (e.g., the optical amplifier 304-1) may depend on the sign of the correlation and the selected performance parameter.

In one example, if the performance parameter is BER, the link controller 120 may adjust the launch power of the first optical amplifier (e.g., the optical amplifier 304-1) based on the sign of the correlation in accordance with the BER. By way of example, if the correlation between the power dither and the performance parameter (e.g., BER) is negative, the link controller 120 may increase the launch power of the first optical amplifier (e.g., the optical amplifier 304-1). In another example, if the correlation between the power dither and the performance parameter (e.g., BER) is positive, the link controller 120 may decrease the launch power of the first optical amplifier (e.g., the optical amplifier 304-1).

In another example, if the performance parameter is SNR, the link controller 120 may adjust the launch power of the first optical amplifier (e.g., the optical amplifier 304-1) based on the sign of the correlation in accordance with the SNR. By way of example, if the correlation between the power dither and the performance parameter (e.g., SNR) is negative, the link controller 120 may decrease the launch power of the first optical amplifier (e.g., the optical amplifier 304-1). In another example, if the correlation between the power dither and the performance parameter (e.g., SNR) is positive, the link controller 120 may increase the launch power of the first optical amplifier (e.g., the optical amplifier 304-1).

In certain non-limiting embodiments, the link controller 120 may keep on adjusting the launch power of the first optical amplifier (e.g., the optical amplifier 304-1) to maintain the correlation between the launch power and the performance parameter as approximately equal to zero.

Figure 5:
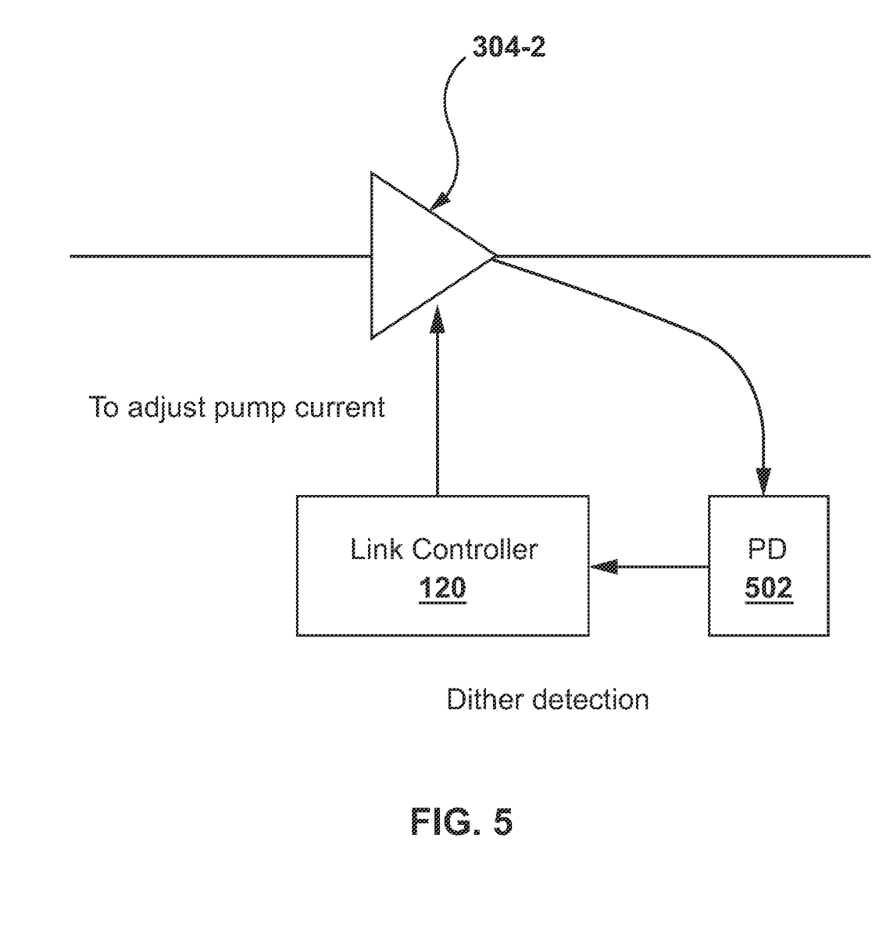
FIG. 5 illustrates a high-level functional block of components for removing the power dither from the selected optical signal, in accordance with various non-limiting embodiments.

In certain non-limiting embodiments, the link controller 120 may remove the power dither from the plurality of optical signals. The power dither may be removed so that the power dither may merely affect the selected optical span (e.g., optical span 302-1). FIG. 5 illustrates a high-level functional block of components for removing the power dither from the plurality of optical signals, in accordance with various non-limiting embodiments. In certain non-limiting embodiments, each of the optical amplifiers (e.g., the optical amplifiers 304-1, 304-2, . . . 304-6) may have an associated photo detector (PD) (e.g., PD 502). The PD 502 may detect the power dither at an output of a second optical amplifier (e.g., the optical amplifier 304-2) in the selected optical span (e.g., the optical span 302-2). The PD 502 may forward the detected power dither to the link controller 120.

The link controller 120 may apply an opposite power dither to the second optical amplifier (e.g., the optical amplifier 304-2). The opposite power dither may have a phase shift of 180 degrees from the power dither. The opposite power dither is applied to cancel (or remove) the power dither.

Thus, by virtue of the techniques presented in the present disclosure, the launch power in the optical link may be improved in an efficient manner.

Figure 6:
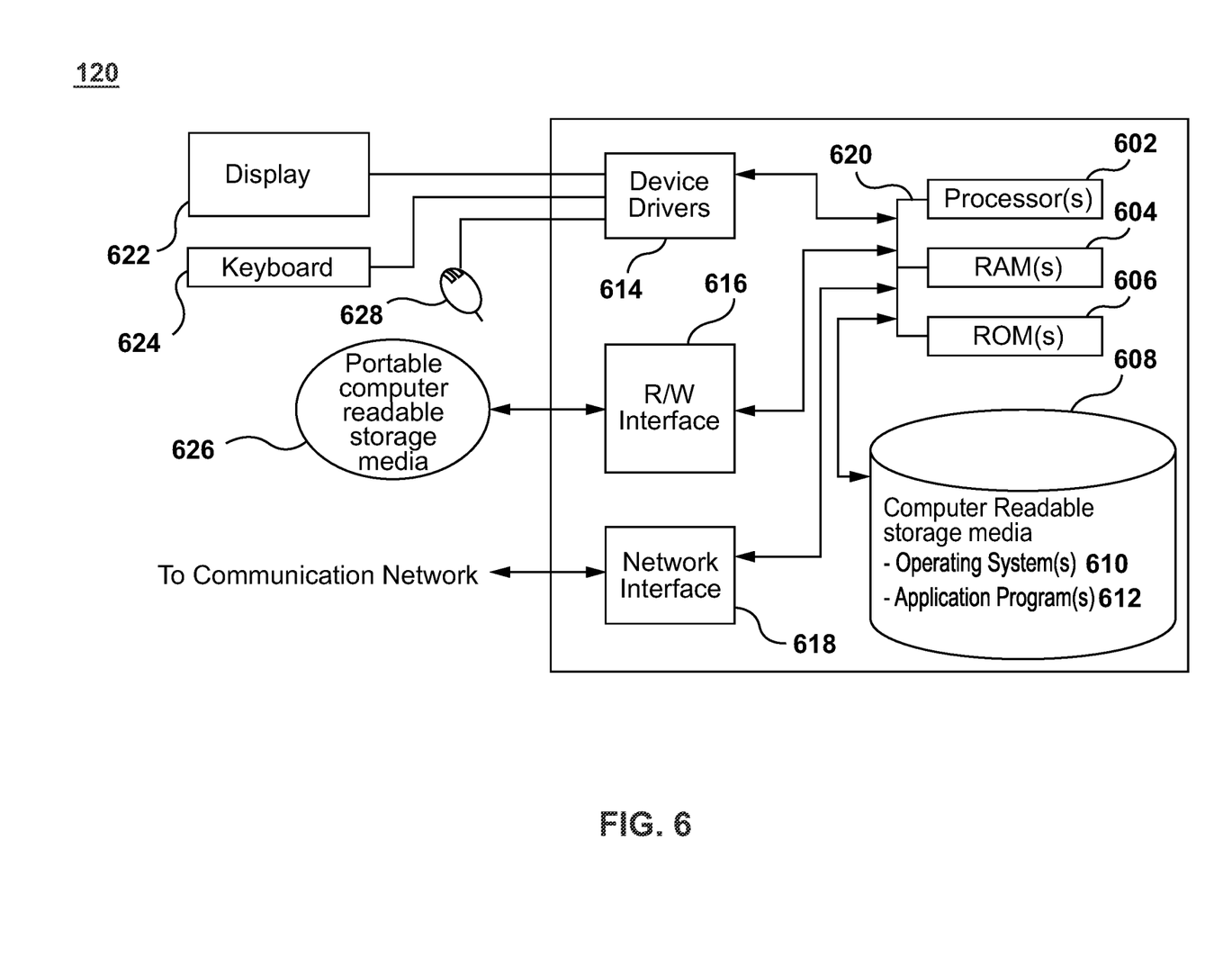
FIG. 6 depicts a high-level block diagram of components of the link controller 120, in accordance with various embodiments of the present disclosure.

FIG. 6 depicts a high-level block diagram of components of the link controller 120, in accordance with various embodiments of the present disclosure. It should be appreciated that FIG. 6 provides only an illustration of one implementation of the link controller 120 and does not imply any limitations with regard to the environments in which different embodiments may be implemented. Various modifications to the depicted environment may be done to implement the link controller 120 without departing from the principles presented herein. The link controller 120 may be a server, a desktop computer, a laptop computer, or any device that may be configured to implement the present technology, as should be understood by a person skilled in the art.

As shown, the link controller 120 employs one or more different type of processors 602, one or more computer-readable random access memories (RAMs) 604, one or more computer-readable read only memories (ROMs) 606, one or more computer-readable storage media 608, device drivers 614, a read/write (R/W) driver interface 616, a network interface 618, all interconnected over a communication fabric 620. The communication fabric 620 may be implemented by any architecture designed for communicating data and/or control information between processors (such as microprocessors, communications and network processors, etc.), system memory, peripheral devices, and any other hardware components within a system.

The processor 602 of the link controller 120 may include one or more of a CPU, an accelerator, a microprocessor, a GPU, an NPU, an ASIC, a FPGA, a dedicated logic circuitry, a dedicated artificial intelligence processor unit, or combinations thereof. It is to be noted that in certain non-limiting embodiments, at least one of the processors 602 may be associated with the receiver 110 to perform various functionalities (such as computing correlation). Where the processor 602 is located in the DWDM optical link 100 should not limit the scope of present disclosure.

One or more operating systems 610 and one or more application programs 612 (examples of application programs may include programming instructions) are stored on one or more of computer-readable storage media 608 for execution by one or more of the processors 602 via one or more of respective RAMs 204 (which typically include a cache memory). In the illustrated embodiment, each of the computer-readable storage media 608 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 616 reads from and writes to one or more portable computer-readable storage media 626. The application programs 612 may be related to the intelligent heterogeneous computing system and stored on one or more of portable computer-readable storage media 626, read via the respective R/W driver interface 616 and loaded into the respective computer-readable storage media 608.

Further, network interface 618 may be based on a TCP/IP adapter card or wireless communication adapter (such as a wireless communication adapter using OFDMA technology). The application programs 612 on the link controller 120 may be downloaded to the link controller 120 from an external computer or external storage device via a communication network (for example, the Internet, a local area network or other wide area network or wireless network) and network interface 618. From network interface 618, application programs 612 may be loaded onto the computer-readable storage media 608. The link controller 120 may connect to routers, firewalls, switches, gateway computers and/or edge servers of the communication network using copper wires, optical fibers, wireless transmission, and the like.

The link controller 120 may also include a display screen 622, a keyboard or keypad 624, and a computer mouse or touchpad 628. The device drivers 614 may interface with display screen 622 for imaging, with the keyboard or the keypad 624, with a computer mouse or touchpad 628, and/or with display screen 622 (which may be a touch sensitive display) for alphanumeric character entry and user selections. The device drivers 614, R/W driver interface 616 and network interface 618 may comprise hardware and software (stored on the computer-readable storage media 608 and/or the ROM 606).

It is to be understood that the operations and functionality of the link controller 120, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for improving a launch power in an optical link comprising:
    randomly selecting an optical span from one or more optical spans within the optical link;
    applying a power dither to a plurality of optical signals propagating in the selected optical span;
    selecting an optical signal from the plurality of the optical signals to which the power dither is applied;
    correlating the power dither with a performance parameter of the selected optical signal; and
    based on the correlation, adjusting the launch power of a first optical amplifier in the selected optical span to minimize the correlation to approximately equal to zero.

2. The method of claim 1 further comprising:
    determining a sign of the correlation; and
    based on the sign of the correlation, adjusting the launch power of the first optical amplifier.

3. The method of claim 1, wherein the optical signal is selected based on one of:
    the optical signal in the plurality of the optical signals having a power approximately equal to an average power of the plurality of optical signals;
    the optical signal in the plurality of the optical signals having a minimum noise margin; and
    the optical signal being any optical signal in the plurality of optical signals.

4. The method of claim 1, wherein the power dither is applied by modulating a pump current of the first optical amplifier in the selected optical span.

5. The method of claim 1, wherein the power dither has a frequency in a range of 1 to 1000 Hz.

6. The method of claim 1, wherein the performance parameter is one of:
    a bit error rate (BER) of the selected optical signal received by a receiver;
    a signal-to-noise ratio (SNR) of the selected optical signal received by the receiver; and
    an error vector magnitude (EVM) of the selected optical signal received by the receiver.

7. The method of claim 1 further comprising removing the power dither from the plurality of the optical signals.

8. The method of claim 7, wherein the removing of the power dither comprises:
    detecting the power dither at an output of a second optical amplifier in the selected optical span; and
    applying an opposite power dither to the second optical amplifier, the opposite power dither having a phase shift of 180 degrees from the power dither, the opposite power dither canceling out the power dither.

9. A system for improving a launch power in an optical link comprising:
- a non-transitory memory element having instructions thereon;
- a processor coupled to the non-transitory memory element, and which executes the instructions to cause the processor to:
  - randomly select an optical span from one or more optical spans within the optical link;
  - apply a power dither to a plurality of optical signals propagating in the selected optical span;
  - select an optical signal from the plurality of the optical signals to which the power dither is applied;
  - correlate the power dither with a performance parameter of the selected optical signal; and
  - based on the correlation, adjust the launch power of a first optical amplifier in the selected optical span to minimize the correlation to approximately equal to zero.

10. The system of claim 9, wherein the processor is further configured to:
- determine a sign of the correlation; and
- based on the sign of the correlation, adjust the launch power of the first optical amplifier.

11. The system of claim 9, wherein the optical signal is selected based on one of:
- the optical signal in the plurality of the optical signals having a power approximately equal to an average power of the plurality of optical signals;
- the optical signal in the plurality of the optical signals having a minimum noise margin; and
- the optical signal being any optical signal in the plurality of optical signals.

12. The system of claim 9, wherein the power dither is applied by modulating a pump current of the first optical amplifier in the selected optical span.

13. The system of claim 9, wherein the power dither has a frequency in a range of 1 to 1000 Hz.

14. The system of claim 9, wherein the performance parameter is one of:
- a bit error rate (BER) of the selected optical signal received by a receiver;
- a signal-to-noise ratio (SNR) of the selected optical signal received by the receiver; and
- an error vector magnitude (EVM) of the selected optical signal received by the receiver.

15. The system of claim 9, wherein the processor is further configured to remove the power dither from the plurality of the optical signals.

16. The system of claim 15, wherein the removing of the power dither comprises:
- detecting the power dither at an output of a second optical amplifier in the selected optical span; and
- applying an opposite power dither to the second optical amplifier, the opposite power dither having a phase shift of 180 degrees from the power dither, the opposite power dither canceling out the power dither.

* * * * *